(12) United States Patent
Adachi et al.

(10) Patent No.: US 9,656,617 B2
(45) Date of Patent: May 23, 2017

(54) WIRE HARNESS

(71) Applicant: YAZAKI CORPORATION, Tokyo (JP)

(72) Inventors: Hideomi Adachi, Shizuoka (JP); Tatsuya Oga, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 38 days.

(21) Appl. No.: 14/684,524

(22) Filed: Apr. 13, 2015

(65) Prior Publication Data

US 2015/0210230 A1    Jul. 30, 2015

Related U.S. Application Data

(63) Continuation of application No. PCT/JP2013/079594, filed on Oct. 31, 2013.

(30) Foreign Application Priority Data

Oct. 31, 2012    (JP) .................................. 2012-241285

(51) Int. Cl.
*B60R 16/02* (2006.01)
*H02G 3/04* (2006.01)
*H02G 3/32* (2006.01)

(52) U.S. Cl.
CPC ...... *B60R 16/0222* (2013.01); *B60R 16/0215* (2013.01); *H02G 3/0406* (2013.01); *H02G 3/0437* (2013.01); *H02G 3/0468* (2013.01); *H02G 3/32* (2013.01)

(58) Field of Classification Search
CPC . B60R 16/0222; H02G 3/0406; H02G 3/0437

USPC ........................................................ 174/72 A
See application file for complete search history.

(56) References Cited

U.S. PATENT DOCUMENTS

| 5,832,960 | A | 11/1998 | Amatsutsu et al. |
| 7,868,256 | B2 | 1/2011 | Suzuki |
| 9,263,865 | B2* | 2/2016 | Adachi ............... B60R 16/0222 |
| 9,403,495 | B2 | 8/2016 | Gotou et al. |
| 2005/0045357 | A1* | 3/2005 | Ichikawa ............ B60R 16/0215 174/50 |
| 2005/0162015 | A1 | 7/2005 | Yamaguchi et al. |
| 2010/0147557 | A1 | 6/2010 | Suzuki |

(Continued)

FOREIGN PATENT DOCUMENTS

| CN | 1667898 A | 9/2005 |
| CN | 201238168 Y | 5/2009 |

(Continued)

OTHER PUBLICATIONS

Japanese Office Action for the related Japanese Patent Application No. 2012-241285 dated Apr. 19, 2016.

(Continued)

*Primary Examiner* — Timothy Thompson
*Assistant Examiner* — Charles Pizzuto
(74) *Attorney, Agent, or Firm* — Kenealy Vaidya LLP

(57) ABSTRACT

A conductive path is formed in an elongated manner to be arranged longitudinally along a vehicle underfloor. An exterior member is made of resin, and is provided in a form without any seam or slit that communicates its outer surface and inner surface and in an elongated manner in accordance with the length of the conductive path.

11 Claims, 11 Drawing Sheets

(56) References Cited

U.S. PATENT DOCUMENTS

| | | |
|---|---|---|
| 2011/0067920 A1 | 3/2011 | Toyama et al. |
| 2011/0094796 A1 | 4/2011 | Toyama et al. |
| 2013/0126232 A1 | 5/2013 | Sakuma |
| 2013/0180776 A1 | 7/2013 | Gotou et al. |
| 2013/0248246 A1 | 9/2013 | Oga |
| 2016/0217886 A1 | 7/2016 | Toyama et al. |

FOREIGN PATENT DOCUMENTS

| | | | |
|---|---|---|---|
| CN | 102035155 A | | 4/2011 |
| CN | 102055122 A | | 5/2011 |
| EP | 0 543 469 A1 | | 5/1993 |
| JP | 2001320818 | * | 11/2001 |
| JP | 2007-12514 A | | 1/2007 |
| JP | 2007-60780 A | | 3/2007 |
| JP | 2007-185067 A | | 7/2007 |
| JP | 2009-106091 A | | 5/2009 |
| JP | 2009-123461 A | | 6/2009 |
| JP | 2009123461 | * | 6/2009 |
| JP | 2009-143326 A | | 7/2009 |
| JP | 2009143326 | * | 7/2009 |
| JP | 2010-51042 A | | 3/2010 |
| JP | 4858403 B2 | | 1/2012 |
| JP | 2012-80672 A | | 4/2012 |
| JP | 2012-165562 A | | 8/2012 |
| JP | 2012-210101 A | | 10/2012 |
| WO | 2008/044345 A1 | | 4/2008 |
| WO | 2012/035811 A1 | | 3/2012 |
| WO | 2012/077826 A1 | | 6/2012 |
| WO | 2012/120720 A1 | | 9/2012 |

OTHER PUBLICATIONS

English language Written Opinion of the International Search Report for PCT/JP2013/079594 dated Dec. 17, 2013.

International Search Report for PCT/JP2013/079594 dated Dec. 17, 2013.

Extended European search report for the related European Patent Application No. 13850693.6 dated Jun. 23, 2016.

Japanese Office Action for the related Japanese Patent Application No. 2012-241285 dated Jul. 5, 2016.

Chinese Office Action for the related Chinese Patent Application No. 201380057082.7 dated Aug. 2, 2016.

Chinese Office Action for the related Chinese Patent Application No. 201380057082.7 dated Mar. 15, 2017.

European Office Action for the European Patent Application No. 13 850 693.6 dated Mar. 10, 2017.

* cited by examiner

WIRE HARNESS

CROSS REFERENCE TO RELATED APPLICATIONS

This application is a continuation of International Patent Application No. PCT/JP2013/079594 filed on Oct. 31, 2013, claiming priority from Japanese Patent Application No. 2012-241285 filed on Oct. 31, 2012, the contents of which are incorporated herein by reference.

FIELD OF INVENTION

The present invention relates to a wire harness including a conductive path and an exterior member.

BACKGROUND ART

Wire harnesses are used as members for electrically connecting high voltage (i.e. for high voltage application) devices in hybrid cars or electric cars.

A wire harness disclosed in the following Patent Document 1 includes a plurality of conductive paths, corrugated tubes made of resin, and protectors made of resin. The corrugated tubes and the protectors accommodate the conductive paths collectively. Each corrugated tube is formed into a bellows tube shape having flexibility, and a plurality of corrugated tubes are provided in parallel with the wire harness and in the longitudinal direction thereof. The protectors are disposed in portions where the path of the wire harness must be restricted. In addition, the protectors are provided in positions where adjacent ones of the corrugated tubes are coupled with each other.

Patent Document 1: JP 2010-51042 A

In the aforementioned background-art technique, a plurality of corrugated tubes are provided, and adjacent ones of the corrugated tubes are coupled with each other by protectors. Therefore, there is a possibility that moisture may be allowed to enter the inside from the outside as long as a sufficient waterproof measure is not applied to the coupling portions.

SUMMARY OF INVENTION

The present invention has been made in view of the circumstances described above, and it is an object thereof to provide a wire harness having high waterproof performance.

To achieve the object described above, a wire harness according to the invention has the following features (1) to (7)

(1) A wire harness including at least one conductive path and an exterior member having a tubular configuration covering the conductive path, wherein the conductive path is formed in an elongated manner to be arranged longitudinally along a vehicle underfloor, and wherein the exterior member is made of resin, and is provided in a form without any seam or slit that communicates an outer surface and an inner surface of the exterior member with each other and in an elongated manner in accordance with length of the conductive path.

The wire harness according to the aforementioned paragraph (1) includes the exterior member made of resin. The exterior member is formed in an elongated form without any seam or any slit that communicates its outer and inner surfaces with each other. Accordingly, when the wire harness is arranged longitudinally along the vehicle underfloor, for example, high voltage devices (such as a motor unit, an inverter unit, a battery, etc.) mounted in a front portion and a rear portion (such as a trunk room or an engine room) of the vehicle can be electrically connected through the wire harness. The wire harness is arranged such that the exterior member having the above configuration naturally passes through the vehicle underfloor, and such that the exterior member having the above configuration also extends longitudinally along the vehicle underfloor, that is, between the front portion and the rear portion of the vehicle, so that the conductive path can be kept away from moisture (that is, kept waterproof) over a wide area. Thus, according to the wire harness according to (1) described above, it is possible to provide a wire harness having higher waterproof performance than conventional ones.

(2) The wire harness according to (1) described above, wherein the exterior member includes a flexible tube portion having flexibility and an inflexible tube portion having less flexibility than the flexible tube portion.

According to the wire harness according to (2) described above, the flexible tube portion is provided at a location that requires bending, and the inflexible tube portion is provided at a location where the path of the wire harness is required to be restricted, so that the wire harness can be arranged along a desired path without using another member. Thus, according to the wire harness according to (2) described above, the wire harness can be bent or the path of the wire harness can be restricted, so that the wiring performance can be improved and the number of parts can be reduced as compared with conventional ones.

(3) The wire harness according to (2) described above, wherein the flexible tube portion is provided near a terminal of the exterior member.

According to the wire harness according to (3) described above, the flexible tube portion is provided near the terminal of the exterior member, so that the wire harness can be bent easily on its terminal side. Thus, according to the wire harness according to (3) described above, it is possible to easily perform work of electric connection between the wire harness and a high voltage device mounted on the vehicle.

(4) The wire harness according to (3) described above, wherein the flexible tube portion provided near the terminal of the exterior member is formed to have a length that allows a terminal portion of the flexible tube portion to extend to a vicinity of a connection member provided in a terminal of the conductive path.

According to the wire harness according to the aforementioned paragraph (4), the flexible tube portion is extended to the vicinity of the connection member provided in the terminal of the conductive path, so that the conductive path up to the vicinity of the connection member can be kept away from moisture (that is, kept waterproof). In addition, according to the wire harness according to (4) described above, easiness to bend the wire harness on its terminal side can be kept even when the conductive path up to the vicinity of the connection member is covered with the flexible tube portion. Thus, according to the wire harness according to (4) described above, the conductive path up to the vicinity of the connection member can be kept away from moisture while the easiness to perform work of electric connection between the wire harness and another high voltage device can be kept.

(5) The wire harness according to (4) described above, wherein a flexible waterproof member extending to the connection member is attached to the terminal portion of the flexible tube portion provided near the terminal of the exterior member.

According to the wire harness according to (5) described above, a flexible waterproof member extending to the connection member is attached to the terminal portion of the flexible tube portion, so that an exposed portion can be eliminated from the conductive path as a whole. In addition, according to the wire harness according to (5) described above, it is possible to prevent moisture from entering from an opening portion in the terminal portion of the flexible tube portion. The waterproof member may be, for example, a boot made of rubber. Thus, according to the wire harness according to (5) described above, the conductive path as a whole can be kept away from moisture (that is, kept waterproof) while it is possible to prevent moisture from entering from an opening portion in the terminal portion of the flexible tube portion.

(6) The wire harness according to any one of (2) to (5) described above, wherein a water stop member is attached to an outer surface of the flexible tube portion, the water stop member being watertight against a member on which the wire harness arranged.

According to the wire harness according to (6) described above, a water stop member such as a grommet is attached to the outer surface of the exterior member, so that moisture can be prevented from entering between the exterior member and the member on which the wire harness is arranged. Thus, according to the wire harness according to (6) described above, waterproofness can be secured between the wire harness and the member on which the wire harness is arranged.

(7) The wire harness according to any one of (1) to (6) described above, wherein the conductive path is formed in an elongated manner so as to be arranged longitudinally along the vehicle underfloor from an engine room disposed on a front side of the vehicle underfloor.

The wire harness according to (7) described above can be used as a wire harness to be electrically connected to a high voltage device (such as an inverter unit) mounted on the engine room. Thus, according to the wire harness according to (7) described above, the conductive path can be kept away from moisture (that is, kept waterproof) even when water is showered from below the engine room, for example, during high-pressure washing or even when water splashes during running.

(8) The wire harness according to any one of (1) to (7) described above, wherein the conductive path is a high voltage conductive path including a shield member.

The wire harness according to (8) described above is a high voltage wire harness including at least one high voltage conductive path and an exterior member keeping the high voltage conductive path away from moisture (that is, waterproof), and a shield member is included in the configuration of the high voltage conductive path, so that a shield function can be provided in the high voltage conductive path itself. That is, it is not necessary to provide a shield function on the exterior member side. Thus, according to the wire harness according to (8) described above, it is possible to simplify the configuration and structure of the exterior member.

EMBODIMENTS OF INVENTION

A wire harness according to the invention includes a resin made exterior member having a waterproof function and a length extending along a vehicle underfloor and to the front and the rear of the vehicle underfloor. The wire harness is elongated, and as for the length other than the length described above, it may have a length extending between the underfloor and the front of the underfloor (for example, an engine room or the front of a cabin).

First Embodiment

Figure 1:
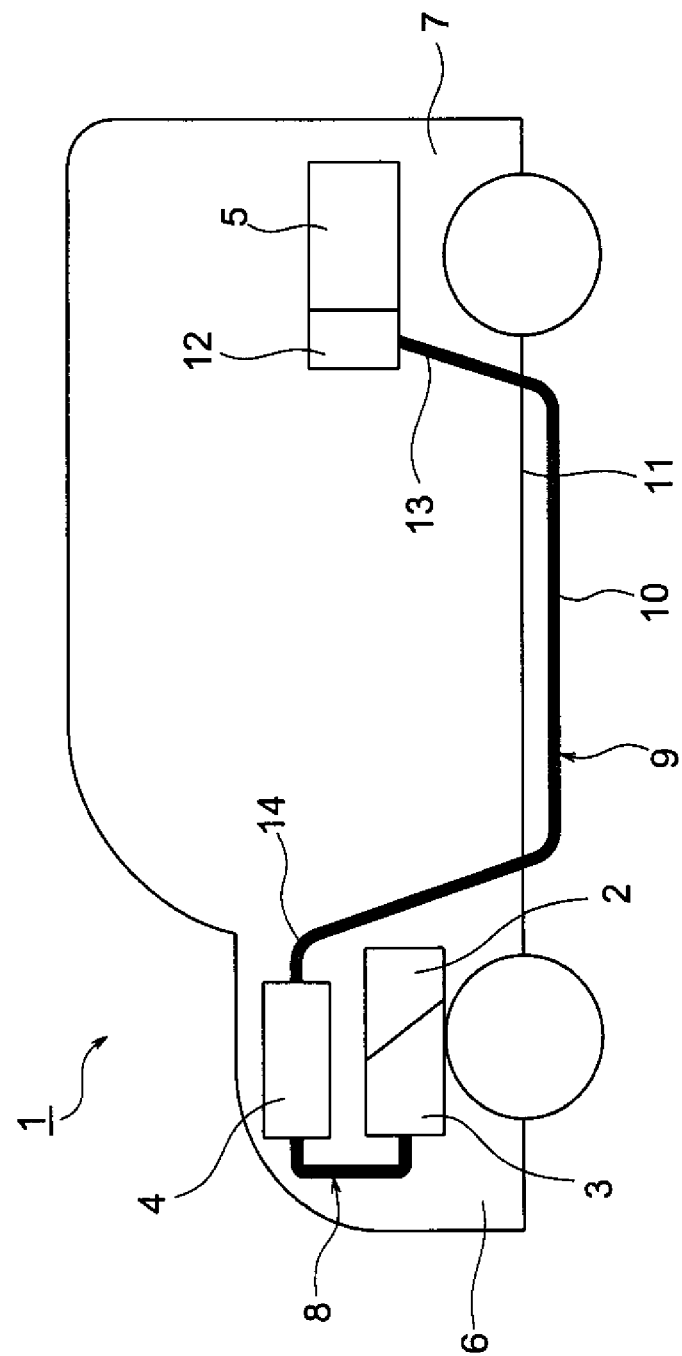
FIG. 1 is a diagram illustrating an arrangement of a wire harness according to a first embodiment.
Figure 2:
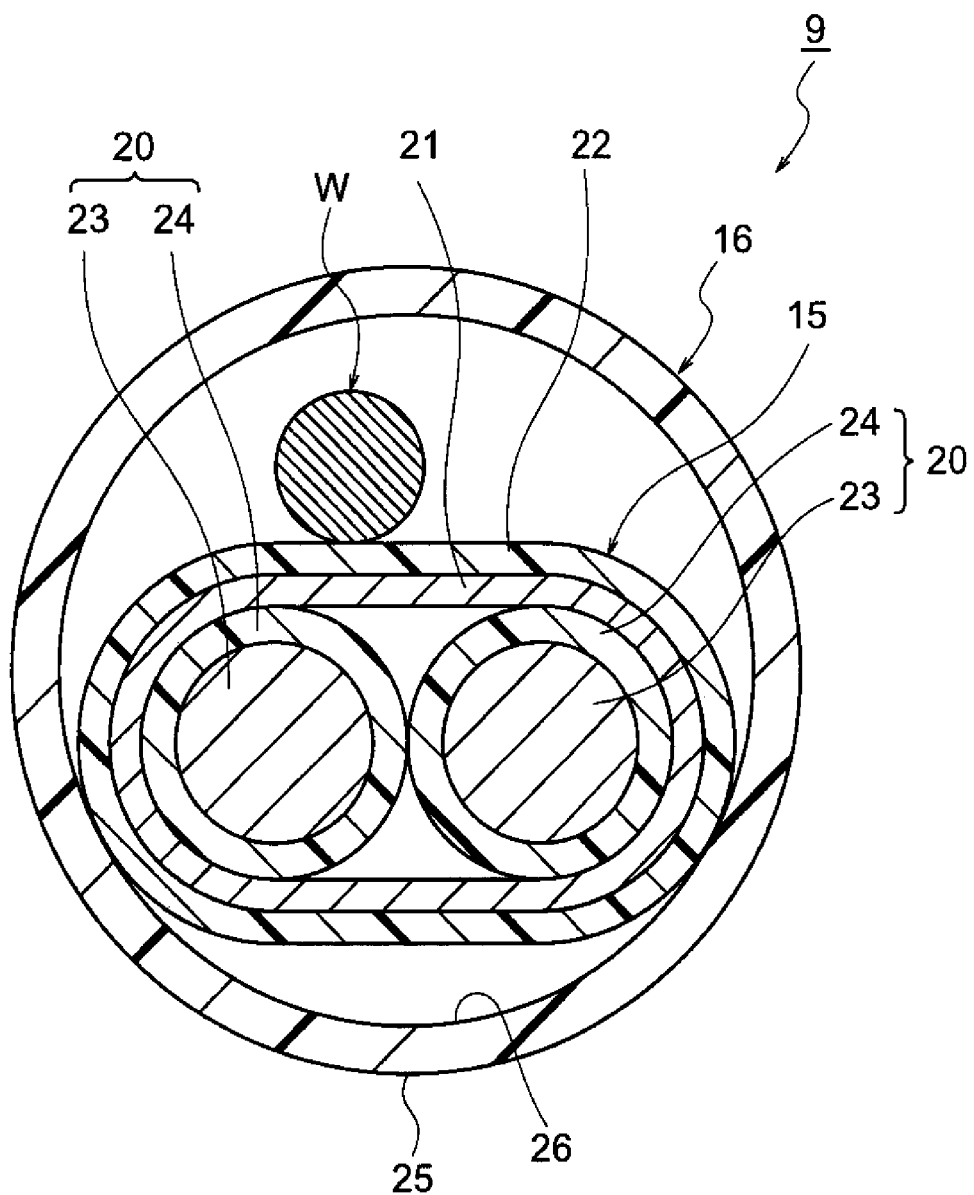
FIG. 2 is a cross-sectional view of the wire harness.
Figure 3:
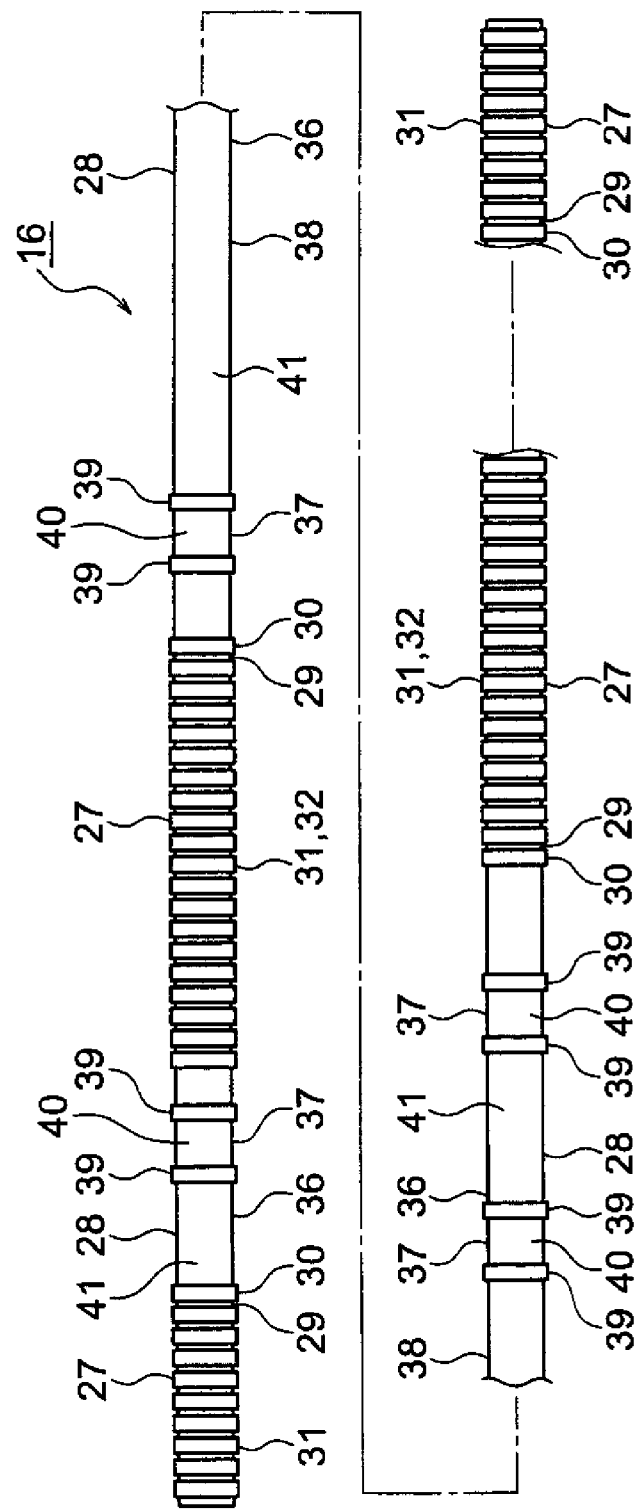
FIG. 3 is a configuration diagram of an exterior member.
Figure 4:
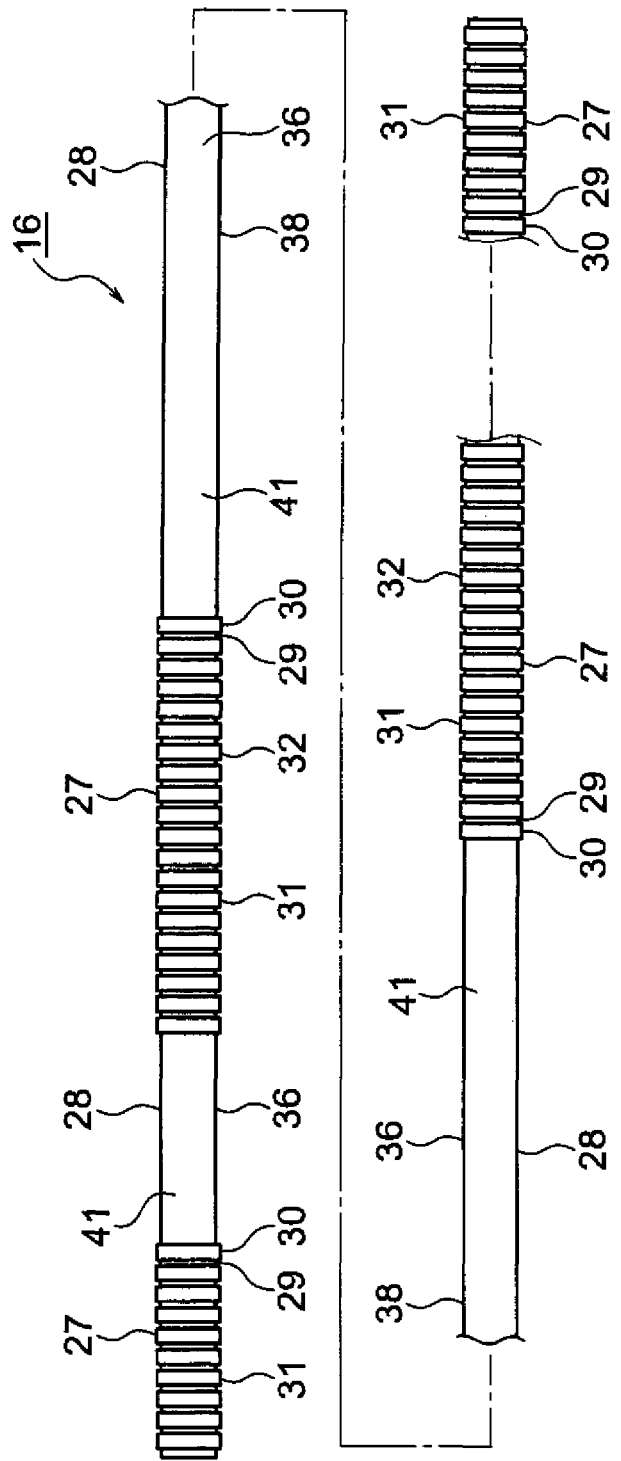
FIGS. 4A and 4B are diagrams illustrating a modification of the exterior member.
Figure 5:
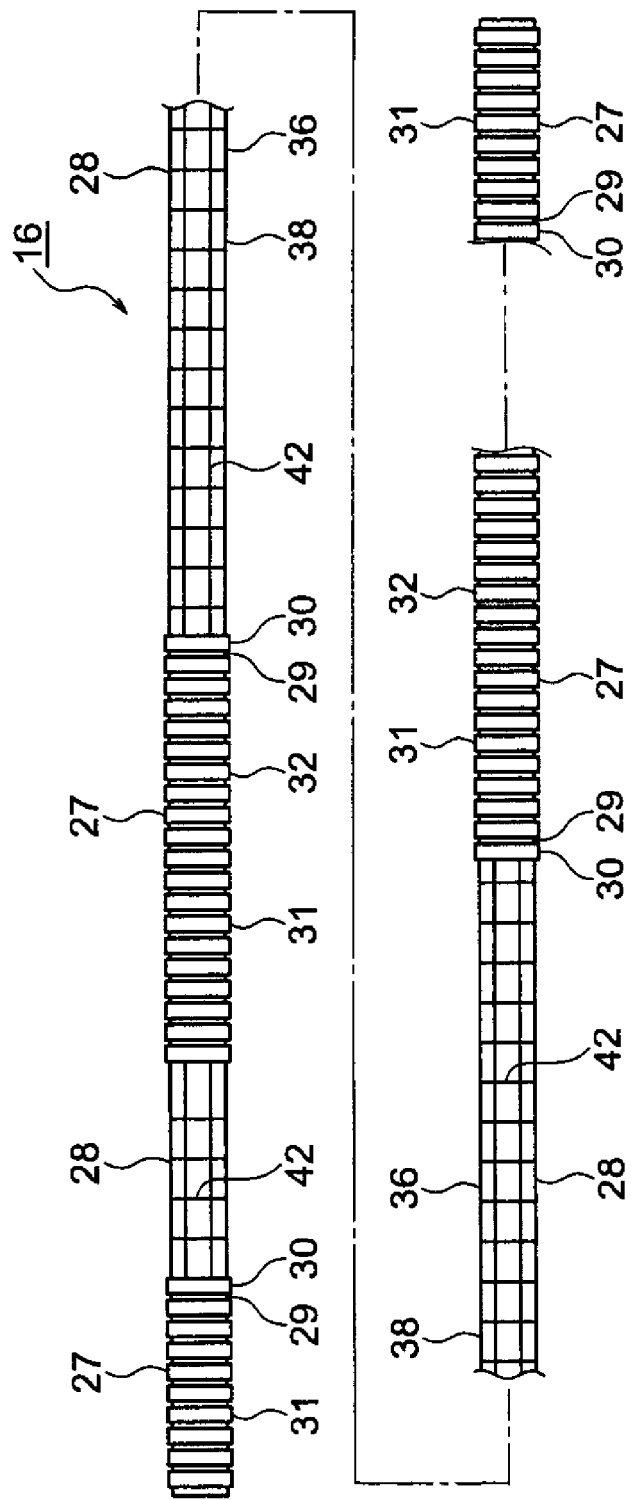
FIG. 5 is a diagram illustrating another modification of the exterior member.
Figure 6:
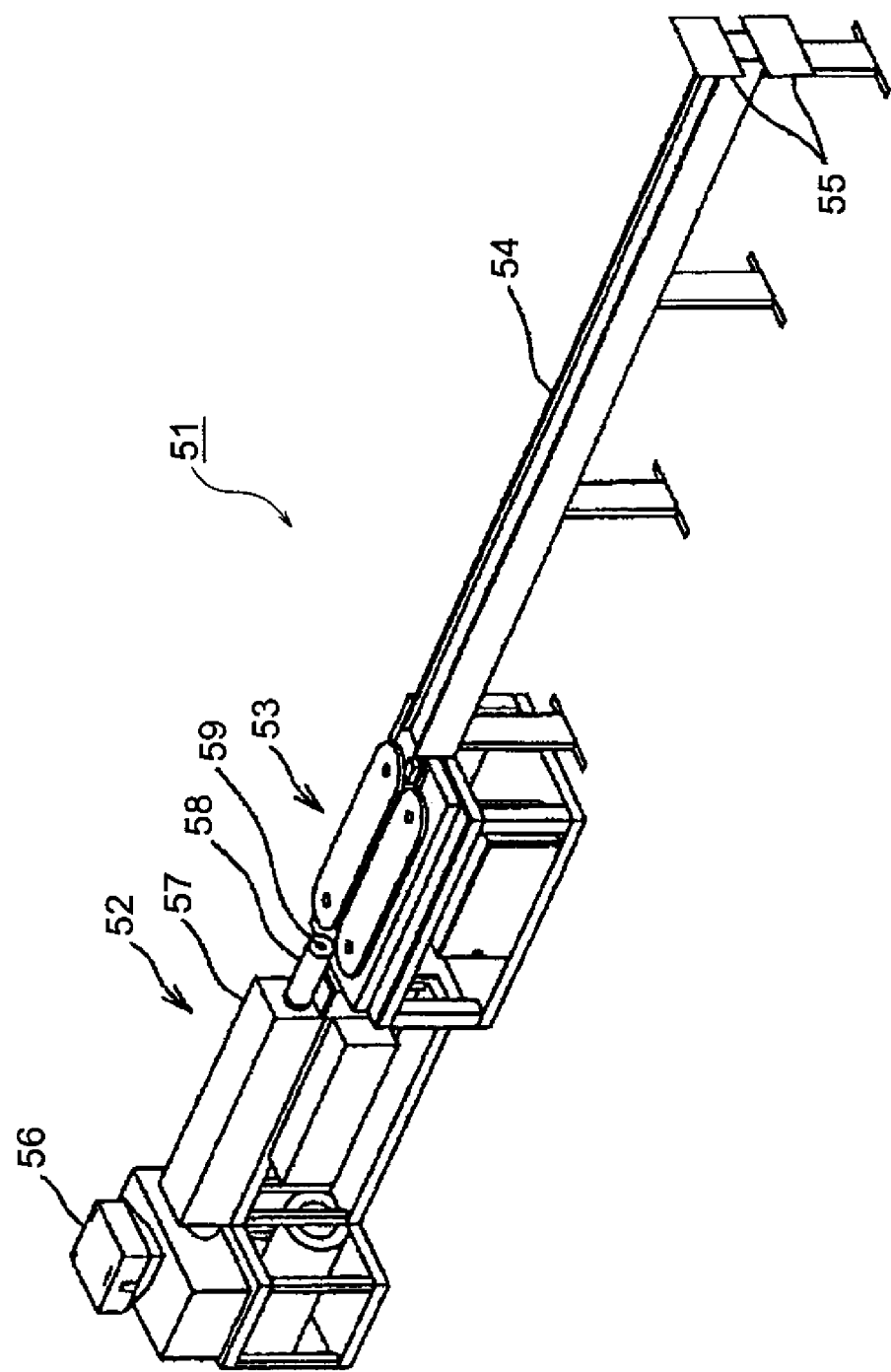
FIG. 6 is a perspective view of an apparatus for manufacturing the exterior member.
Figure 7:
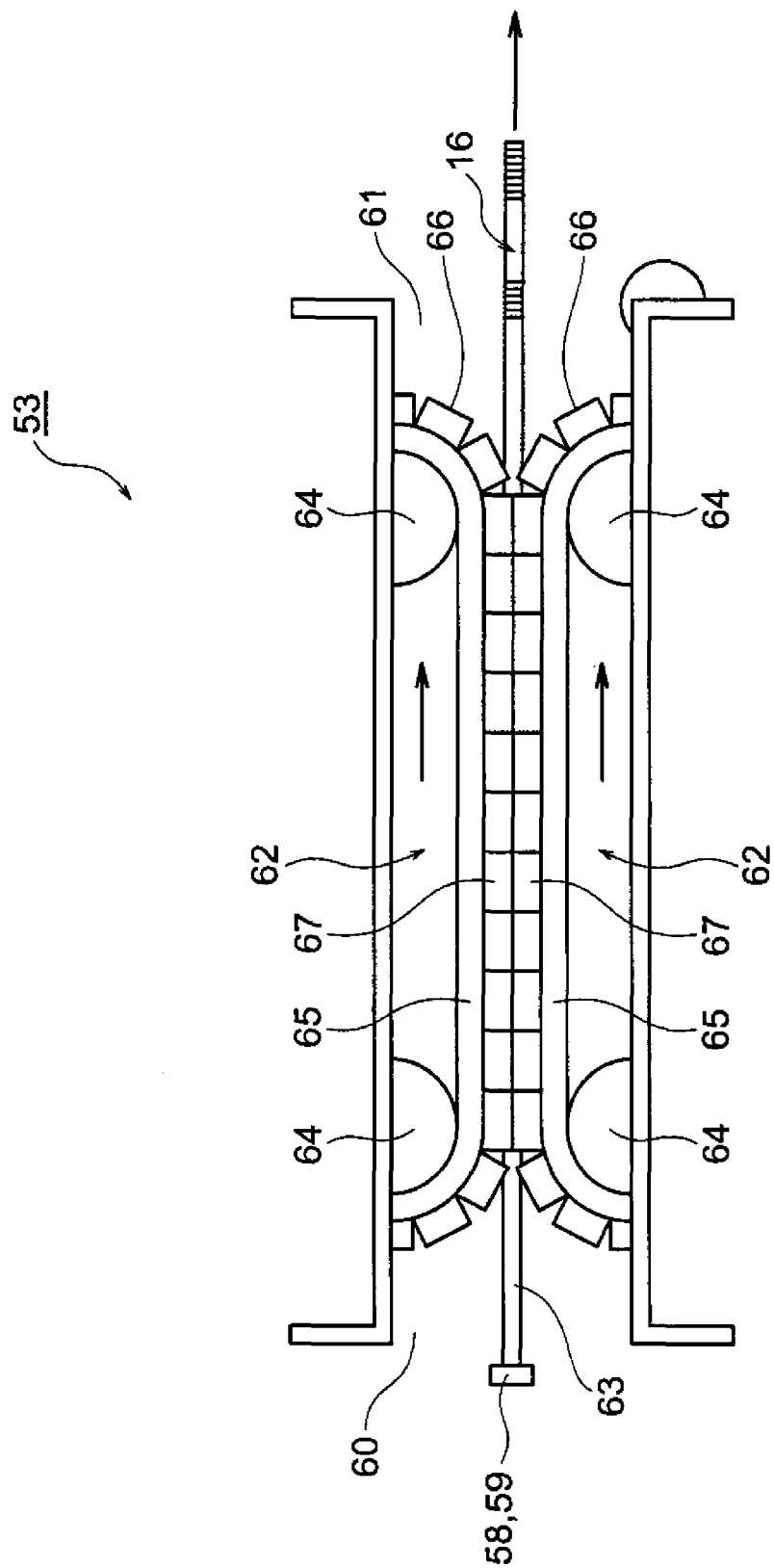
FIG. 7 is a plan view of a main portion of the manufacturing apparatus of FIG. 6.
Figure 8:
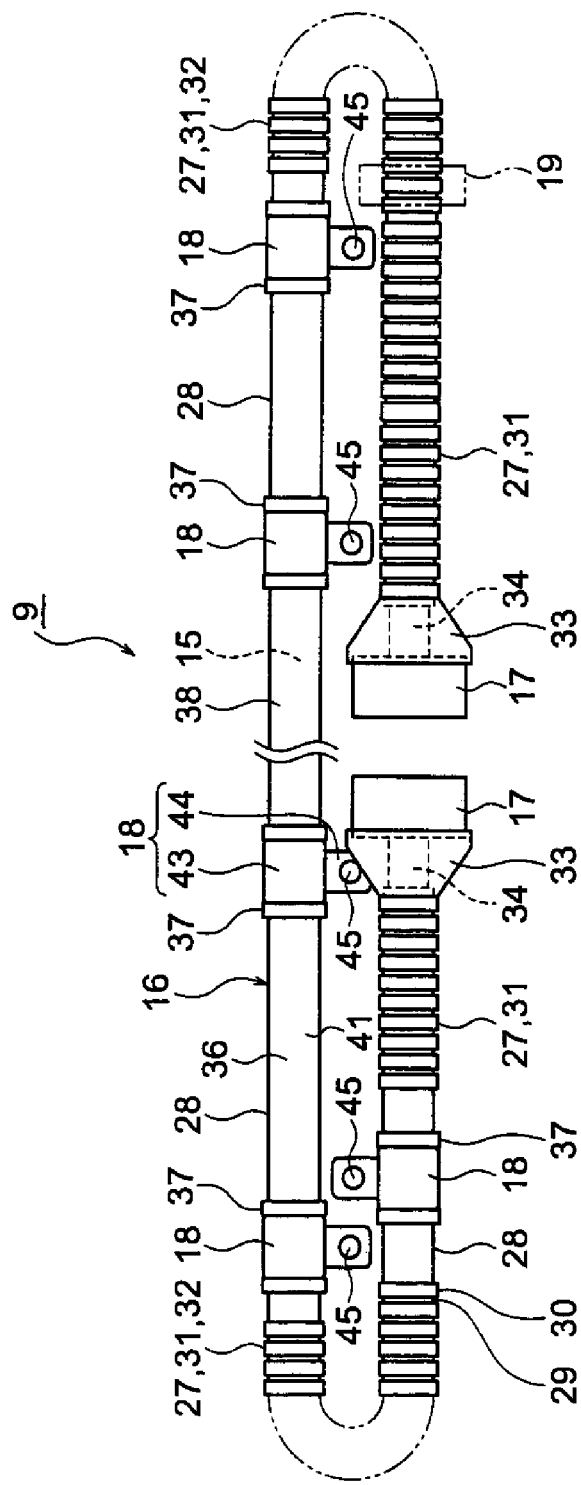
FIG. 8 is a diagram illustrating a wire harness at the time of transportation.
Figure 9:
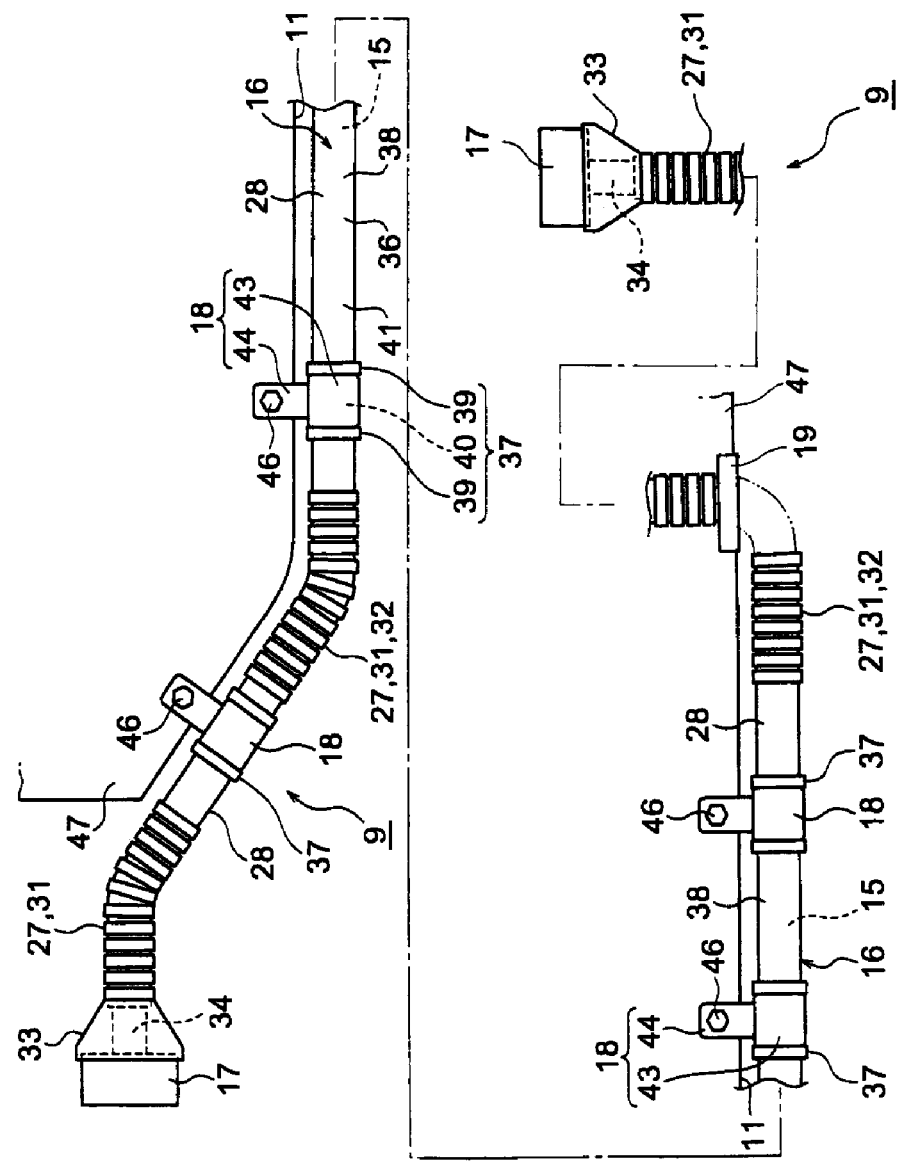
FIG. 9 is a diagram illustrating a wire harness at the time of arranging along a wiring path.

A first embodiment of a wire harness according to the invention will be described below with reference to FIG. 1 to FIG. 9. FIG. 1 is a schematic of an arrangement of the wire harness according to the first embodiment. FIG. 2 is a cross-sectional view of the wire harness. FIG. 3 is a configuration diagram of an exterior member. FIGS. 4A to 5 are diagrams illustrating modifications of the exterior member. FIG. 6 is a perspective view of an apparatus for manufacturing the exterior member. FIG. 7 is a plan view of a main portion of the manufacturing apparatus of FIG. 6. FIG. 8 is a diagram illustrating a wire harness at the time of transportation. FIG. 9 is a diagram illustrating a wire harness at the time of arranging along a wiring path.

In the first embodiment, description will be made along an example in which the invention is applied to a wire harness arranged in a hybrid car (may be an electric car or a general car).

In FIG. 1, the reference numeral 1 represents a hybrid car. The hybrid car 1 is a vehicle which is driven by a mixture of two power sources, that is, an engine 2 and a motor unit 3. To the motor unit 3, electric power is supplied from a battery 5 (i.e., a battery pack) through an inverter unit 4. In this example, the engine 2, the motor unit 3 and the inverter unit 4 are mounted in an engine room 6 which is close to front wheels etc. On the other hand, the battery 5 is mounted in a car rear portion 7 which is close to rear wheels etc. Incidentally, the battery 5 may be mounted in a car cabin which is located at the rear of the engine room 6.

The motor unit 3 and the inverter unit 4 are electrically connected through a high voltage wire harness 8. In addition, the battery 5 and the inverter unit 4 are also electrically connected through a high voltage wire harness 9. The wire harness 9 is formed in an elongated manner, and an intermediate portion 10 of the wire harness 9 is arranged on a vehicle underfloor 11. In addition, the wire harness 9 (i.e., a high voltage conductive path 15 and an exterior member 16 which will be described later) is arranged substantially parallel to the vehicle underfloor 11 so as to extend between the front and the rear of the vehicle underfloor 11. The vehicle underfloor 11 is a well-known body which is a so-called panel member. Through holes (not shown) are formed in predetermined positions of the vehicle underfloor 11. The wire harness 9 is inserted into one of the through holes. Thus, from the engine room 6 disposed on the front side of the vehicle underfloor 11, the wire harness 9 is passed through the through hole and arranged longitudinally along the vehicle underfloor 11. The wire harness 9 is passed through another through hole again and then arranged to reach a car rear portion 7 disposed on the rear side of the vehicle underfloor 11.

The wire harness 9 and the battery 5 are electrically connected through a junction block 12 which is provided in the battery 5. A rear end 13 of the wire harness 9 is electrically connected to the junction block 12 by a well-known method. On the other hand, a front end 14 of the wire harness 9 is electrically connected to the inverter unit 4 by a well-known method.

The motor unit 3 has a motor (not shown) and a generator (not shown). On the other hand, the inverter unit 4 has an inverter (not shown) and a converter (not shown). The motor unit 3 is formed as a motor assembly including a shield case (not shown). The inverter unit 4 is also formed as an inverter assembly including a shield case (not shown). The battery 5 is a modularized one based on Ni-MH or Li-ion. For example, an electric storage device such as a capacitor may be used. The battery 5 is not limited especially as long as it can be used in the hybrid car 1 or an electric car.

First, the configuration and structure of the wire harness 9 will be described.

In FIG. 2, the wire harness 9 has a high voltage conductive path 15 (that is, a conductive path), an exterior member 16 for accommodating and protecting the high voltage conductive path 15, shield connectors 17 (that is, connection members, see FIGS. 8 and 9) which are provided on terminals of the high voltage conductive path 15, a plurality of clamps 18 (that is, fixation members, see FIGS. 8 and 9) which are attached to the outer surface of the exterior member 16, and grommets 19 (that is, water stop members, see FIGS. 8 and 9) which are watertightly attached to the outer surface of the exterior member 16 in the same manner.

Incidentally, the wire harness 9 may be arranged so that a low voltage conductive path can be accommodated and protected by the exterior member 16 together with the high voltage conductive path 15. In this case, the low voltage conductive path is, for example, disposed in a position designated by the reference sign W in FIG. 2.

The high voltage conductive path 15 has two high voltage circuits 20, a shield member 21 which covers the two high voltage circuits 20, and a sheath 22 which is provided on the outer side of the shield member 21. This configuration of the high voltage conductive path 15 is merely an example.

Each high voltage circuit 20 is a well-known high voltage electric wire, which has a conductor 23 and an insulator 24 with which the conductor 23 is coated. The high voltage circuit 20 has a length required for electric connection. The high voltage circuit 20 is formed to be so long that the wire harness 9 can electrically connect the inverter unit 4 and the battery 5 (or the junction block 12) with each other (see FIG. 1).

The conductor 23 is produced out of copper, a copper alloy, aluminum, or an aluminum alloy. The conductor 23 may have a conductor structure which consists of twisted strands or a rod-like conductor structure which is rectangular or circular in section (for example, a conductor structure which serves as a rectangular single core or a circular single core. In this case, the electric wire itself also has a rod-like shape). The insulator 24 made of an insulating resin material is formed on the outer surface of the aforementioned conductor 23 by extrusion molding.

Incidentally, the configuration of a well-known high voltage electric wire is, though not limited thereto, used as the high voltage circuit 23 in the first embodiment. That is, a high voltage circuit in which an insulator is provided in a well-known bus bar, or the like, may be used as the high voltage circuit 20.

The shield member 21 is an electromagnetic shield member (that is, an anti-electromagnetic wave shield member) which covers the two high voltage circuits 20 collectively. A well-known braid which consists of a large number of strands braided into a cylindrical shape is used as the shield member 21. The shield member 21 is formed to be substantially as long as the whole length of the two high voltage circuits 20. An end portion of the shield member 21 is electrically connected to a shield case or the like (not shown) of the inverter unit 4 (see FIG. 1) through the shield connector 17 (see FIGS. 8 and 9).

As the shield member 21, for example, metal foil having electric conductivity or a member including the metal foil may be used as long as it can take a measure against electromagnetic waves.

The sheath 22 is formed by extrusion of an insulating resin material into a predetermined thickness on the outer side of the shield member 21. The sheath 22 is disposed in a position corresponding to an outermost layer of the high voltage conductive path 15. The sheath 22 is subjected to terminal processing during the manufacturing of the wire harness 9 so that the shield member 21 can be exposed with a predetermined length. Incidentally, the sheath 22 which has been subjected to the terminal processing is, for example, set to be slightly longer than the exterior member 16.

Another example of the conductive path than the high voltage conductive path 15 may include a high voltage coaxial composite conductive path 72 which will be described later with reference to FIG. 11. Further another example of the conductive path may include a well-known shield wire or the like. Incidentally, it will go well if the number of conductive paths is at least one. The number of conductive paths may be plural.

In FIGS. 2 and 3, the exterior member 16 is a tube body made of resin and covering the high voltage conductive path 15, and the exterior member 16 is formed to have a length required to accommodate the high voltage conductive path 15 and to have a thickness required to protect the same. The exterior member 16 is also provided in a form without any seam or slit that communicates its outer surface 25 and inner surface 26 with each other (i.e., connects the outer surface 25 and the inner surface 26 with each other). The exterior member 16 is configured to keep the high voltage conductive path 15 away from moisture (or waterproof), and formed in an elongated manner.

In the first embodiment, the exterior member 16 is formed into a circular shape in section. This sectional shape of the exterior member 16 is merely an example. As will be described later in a second embodiment, the sectional shape of the exterior member 16 may be an elliptical shape, an oval shape or a rectangular shape. The exterior member 16 is, for example, formed into a shape shown in FIG. 3, including a plurality of flexible tube portions 27 which have flexibility, and a plurality of inflexible tube portions 28 which do not have flexibility as high as the flexible tube portions 27 (or have lower flexibility than the flexible tube portions 27).

The flexible tube portions 27 and the inflexible tube portions 28 are molded integrally out of resin so as to have a linear shape as a whole when the flexible tube portions 27 are not bent. The flexible tube portions 27 and the inflexible tube portions 28 are disposed alternately and continuously in the tube axis direction.

The flexible tube portions 27 are disposed at positions corresponding to the shape of attachment to a vehicle (the shape of an object along which the wire harness is arranged, such as a fixing target 47 which will be described later). In addition, the flexible tube portions 27 are formed to have a length that is in accordance with the shape of attachment to the vehicle. Incidentally, when the flexible tube portions 27 are made different in length in the tube axis direction, the flexible tube portions 27 can be bent with required lengths. The flexible tube portions 27 arranged thus can be bent at desired angles respectively during transportation of the wire harness and during wiring path arrangement on the vehicle as will be described later.

Each flexible tube portion 27 can be bent into a curved shape, and can of course be resumed to its original straight shape.

In the first embodiment, each flexible tube portion 27 is formed into a bellows tube shape. Incidentally, the shape of the flexible tube portion 27 is not limited especially but it will go well if it has flexibility. Specifically, the flexible tube portion 27 is formed to have concave portions 29 and convex portions 30 extending circumferentially so as to make the concave portions 29 and the convex portions 30 continuous and alternate in the tube axis direction.

The flexible tube portions 27 include wiring path arrangement flexible tube portions 31 (see FIG. 9) which can be bent during the wiring path arrangement and transportation flexible tube portions 32 (see FIG. 8) which can be bent during the wire harness transportation. The flexible tube portions 27 may be disposed in portions which do not have to be bent.

The exterior member 16 is formed into a shape in which the flexible tube portions 27 are disposed on its terminal sides (i.e., near its terminals). In addition, the exterior member 16 is formed to be so long that end portions of the flexible tube portions 27 disposed on the terminal sides (i.e., near the terminals) can extend to the vicinities of the shield connectors 17 (that is, the connection members, see FIGS. 8 and 9) respectively. The vicinity of the shield connector 17 means an enough long distance from the shield connector 17 not to hinder the work of electric connection to the inverter unit 4 (see FIG. 1) etc. or an enough long distance from the shield connector 17 not to hinder the work of terminal processing on the high voltage conductive path 15. Since each flexible tube portion 27 has flexibility as described above, the flexible tube portion 27 can be extended up to a significantly close distance from the shield connector 17.

The aforementioned work of electric connection involves bending. From this fact, consider the case where the flexible tube portions 27 are not disposed but the inflexible tube portions 28 are disposed. In this case, the end portions of the inflexible tube portions 28 may be separated from the shield connectors 17. When the end portions are separated from the shield connectors 17, the degree of exposed parts in terminal portions 34 of the high voltage conductive path 15 which will be described later increases. From this consideration, it is effective to dispose not the inflexible tube portions 28 but the flexible tube portions 27 at places which have to be bent.

Flexible waterproof members extending to the shield connectors 17 (see FIGS. 8 and 9) are attached to the end portions of the flexible tube portions 27 disposed on the terminal sides, respectively. For example, boots 33 (see FIGS. 8 and 9) made of rubber, or the like, may be used as the waterproof members. The boots 33 are attached to cover the terminal portions 34 (see FIGS. 8 and 9) of the high voltage conductive path 15 extracted from the end portions of the flexible tube portions 27, or the opening portions of the end portions of the flexible tube portions 27, respectively. Incidentally, the waterproof members are attached optionally, but it will go well if they are absent. For example, the boots 33 may be replaced by tape winding portions consisting of waterproof tape which is wound.

Water stop members are attached to, of the flexible tube portions 27 in the exterior member 16, the flexible tube portions 27 disposed in accordance with the positions of the aforementioned through holes in the vehicle underfloor 11 (see FIG. 1), respectively. The water stop members are watertight against the outer surfaces of the flexible tube portions 27 and also watertight against the through holes. For example, grommets 19 (see FIGS. 8 and 9) made of rubber may be used as the water stop members. The grommets 19 are attached as members for preventing moisture from entering through the through holes.

The exterior member 16 is formed into such a shape that the portions where the flexible tube portions 27 are disposed serve just like corrugated tubes. I.e., the exterior member 16 is formed into a shape in which corrugated tubes are provided partially. Since the exterior member 16 includes a portion whose shape is similar to that of a corrugated tube as described above, the exterior member 16 can be regarded as a "corrugated tube", a "partially shaped corrugated tube" or the like.

The exterior member 16 is provided in a form without any slit (i.e., unslitted) in its tube axis direction. The reason why no slit is provided is to prevent moisture from leaking into the exterior member 16, to thereby improve waterproofness. Another reason is to prevent the high voltage conductive path 15 from sticking out in a bent portion. Yet another reason is to increase the rigidity of the exterior member 16 itself. In addition, the exterior member 16 is provided in a form without any seam in its circumferential direction. The reasons why no seam is provided are the same as the aforementioned reasons why no slit is provided.

Each inflexible tube portions 28 includes an inflexible tube portion body 36 and a mounting portion 37. The inflexible tube portion body 36 is formed as a portion which cannot be bent in a packed state which will be described later, during transportation or during wiring path arrangement. The portion which cannot be bent means a portion which is not aggressively provided with flexibility. The inflexible tube portion body 36 is formed into a straight tube shape which is circular in section. The sectional shape of the inflexible tube portion body 36 is not limited to a circular shape but may be an elliptical shape, an oval shape or a rectangular shape.

The inflexible tube portion 28 is formed into a straight tube shape as illustrated. Therefore, the inflexible tube portion 28 can be also regarded as a "straight tube portion", a "straight portion" or the like. The inflexible tube portion 28 is formed in a rigid portion, as compared with the flexible tube portion 27. The inflexible tube portion 28 is also formed into a position or a length corresponding to the aforementioned shape of attachment to the vehicle.

The exterior member 16 has an underfloor inflexible tube portion 38 arranged on the vehicle underfloor 11 as the inflexible tube portion 28 (see FIG. 1). Since the underfloor inflexible tube portion 38 is arranged on the vehicle underfloor 11 (for example, arranged to extend along a lean hose), the underfloor inflexible tube portion 38 is formed to be long. The underfloor inflexible tube portion 38 is a type of inflexible tube portion 28. A plurality of mounting portions 37 are also formed in the underfloor inflexible tube portion 38 configured thus.

The mounting portions 37 are formed as portions to which the clamps 18 (see FIGS. 8 and 9) can be attached. In addition, the mounting portions 37 are formed integrally (that is, molded integrally) with the inflexible tube portion bodies 36. Since the exterior member 16 is made of resin, the mounting portions 37 can be easily integrated with the inflexible tube portion bodies 36. Incidentally, the mounting portions 37 are provided in portions to which the clamps 18 should be attached, while some inflexible tube portions 28 are not provided with the mounting portions 37. Further, the mounting portions 37 in the first embodiment are formed at a plurality of places of the exterior member 16, though no limited thereto.

Each mounting portion 37 includes a pair of movement restriction portions 39 and an attaching portion 40. The paired movement restriction portions 39 are disposed in positions corresponding to opposite sides of the clamp 18 (see FIGS. 8 and 9). The paired movement restriction portions 39 are formed as portions for restricting movement of the clamp 18 in the tube axis direction. In addition, the paired movement restriction portions 39 are also formed as portions for recognizing the attachment position of the clamp 18. In the first embodiment, each of the paired movement restriction portions 39 is formed into a ring-like flange shape. Specifically, the movement restriction portion 39 is formed into a shape which protrudes from an outer surface 41 of the inflexible tube portion body 36 and which is a convex in the circumferential direction. Incidentally, the shape of the movement restriction portion 39 is merely an example.

In order to absorb dimensional deflection of a fixed position during wiring path arrangement, it is effective that a slightly wide interval is secured between the paired movement restriction portions 39 at a predetermined place. Due to the slightly wide interval, the clamp 18 (see FIGS. 8 and 9) can be allowed to slide and move. As a result, the aforementioned dimensional deflection can be absorbed.

In the first embodiment, each of the paired movement restriction portions 39 is, for example, formed so that the protruding height or the width of the movement restriction portion 39 can agree with the protruding height or the width of the convex portion 30 in the flexible tube portion 27. Incidentally, the shape of the movement restriction portion 39 is merely an example.

Each attaching portion 40 is formed as a portion to which the clamp 18 (see FIGS. 8 and 9) can be attached directly. The outer surface 41 located between the paired movement restriction portions 39 corresponds to the attaching portion 40, which is formed as a curved surface. Incidentally, in order to surely prevent the clamp 18 from rotating after the clamp 18 is attached, it is effective that a portion biting into the attaching portion 40 which is a curved surface is provided on the clamp 18 side. In addition, it is also effective that a rotation stopper structure such as irregularities is added to the mounting portion 37 or the clamp 18.

Here, some modifications of the exterior member 16 will be given. In the exterior member 16 shown in FIG. 4A, each inflexible tube portion 28 is formed into a shape having only the inflexible tube portion body 36. That is, the inflexible tube portion 28 is formed without the mounting portion 37 (see FIG. 3). The exterior member 16 may be configured thus.

On the other hand, the exterior member 16 shown in FIG. 4B is formed into a shape in which a transportation flexible tube portion 32 is disposed in the middle of the underfloor inflexible tube portion 38. The exterior member 16 configured thus is effective when the underfloor inflexible tube portion 38 is too long to be transported.

Finally, in the exterior member 16 shown in FIG. 5, the mounting portion 37 is not formed, but a plurality of ribs 42 are formed to extend in at least one of the tube axis direction (that is, the longitudinal direction) and the circumferential direction. The ribs 42 are formed as portions for enhancing rigidity. In addition, the ribs 42 are also formed as portions which can be attached to the clamp 18 (see FIGS. 8 and 9) and as portions which can prevent the clamp 18 from rotating.

The exterior member 16 which has been described above is manufactured by the following manufacturing apparatus and the following manufacturing method. The manufacturing apparatus and the manufacturing method will be described below with reference to FIG. 6 and.

In FIG. 6, the reference numeral 51 represents a manufacturing apparatus for molding the exterior member 16 (for example, see FIGS. 3 to 5) out of resin. The manufacturing apparatus 51 has a resin extruding portion 52, a molding portion 53, a cooling portion 54 and a cutting portion 55.

The molding portion 53 is continued on the downstream side of the resin extruding portion 52. In addition, the cooling portion 54 is continued on the downstream side of the molding portion 53. The cutting portion 55 is disposed at the terminal of the cooling portion 54 (that is, disposed at the terminal of the apparatus) so as to operate to cut the exterior member 16 into a predetermined length.

The resin extruding portion 52 has a hopper 56 serving as a portion where a resin material is injected, an extruding portion body 57 following the hopper 56 and extending horizontally, and a dice 58 protruding from an end portion of the extruding portion body 57. The dice 58 has a resin material extrusion port 59. The resin material extrusion port 59 is disposed in an inlet 60 (see FIG. 7) of the molding portion 53.

In FIG. 7, the molding portion 53 is a portion which performs resin molding straightly between the inlet 60 and an outlet 61 and includes a pair of molding structure portions 62. The molding structure portions 62 are disposed and paired on the opposite left and right sides of a flexible and cylindrical resin material 63 drawn from the resin material extrusion port 59 of the dice 58 (see FIG. 6). The paired molding structure portions 62 are arranged to be able to mold the resin material 63 into a predetermined shape.

Each molding structure portion 62 has timing pulleys 64 which are paired in the traveling direction of the resin material 63, an endless belt 65 which is moved in the arrow direction in FIG. 7 by the paired timing pulleys 64, and a mold block assembly 66 which is attached to the endless belt 65 so that the mold block assembly 66 can move.

The mold block assembly 66 has a plurality of mold blocks 67. The mold blocks 67 are arranged without any space in the straight portion of the endless belt 65. Each mold block 67 is replaceably fixed to the endless belt 65.

Incidentally, the aforementioned manufacturing apparatus 51 or the aforementioned manufacturing method is merely an example. Alternatively, for example, a blow type one may be used.

In FIGS. 8 and 9, well-known clamps may be used as the clamps 18 which are attached to the mounting portions 37.

Each clamp 18 has a tube body attachment portion 43 which is formed in accordance with the external shape of the inflexible tube portion 28 (or the external shape of the attaching portion 40), and a fixation portion 44 which has a cantilever-like shape continued to the tube body attachment portion 43. Bolt insertion holes 45 are formed in the fixation portions 44 to penetrate the fixation portions 44 respectively. The wire harness 9 is fixed to a fixing target 47 (i.e., a member on which the wire harness is arranged) such as the vehicle underfloor 11 through bolts 46 inserted into the bolt insertion holes 45. The shape of the fixing target 47 is merely an example. When the wire harness 9 is attached and fixed to the fixing target 47, wiring path arrangement is completed as shown in FIG. 9.

Well-known shield connectors 17 are provided in opposite terminals of the wire harness 9 respectively. One of the shield connectors 17 is an inverter-side shield connector, and the other shield connector 17 is a battery-side shield connector. The shield connectors 17 are electrically connected to terminal portions 34 of the high voltage conductive path 15 extracted from the flexible tube portions 27, respectively. The boots 33 are attached between the end portions of the flexible tube portions 27 and the shield connectors 17 respectively.

Next, manufacturing, transportation and wiring path arrangement of the wire harness 9 will be described. First in the process for manufacturing the wire harness 9, the high voltage conductive path 15 is inserted into the exterior member 16 which has been molded into a substantially straight line as a whole. After that, the shield connectors 17 are provided in the terminal portions 34 of the high voltage conductive path 15. Then the clamps 18 are attached to the exterior member 16 correspondingly to the positions of the mounting portions 37. Then the boots 33 and the grommets 19 are attached to predetermined positions of the outer surface of the exterior member 16. As a result of the aforementioned process, manufacturing the wire harness 9 is completed.

When the wire harness 9 which has been manufactured is bent to fold in portions of predetermined flexible tube portions 27 as shown in FIG. 8, the wire harness 9 is disposed in a state in which the inflexible tube portions 28 (the inflexible tube portions 28 and the underfloor inflexible tube portion 38 in FIG. 8) are substantially parallel with each other. More specifically, the wire harness 9 is disposed so that the inflexible tube portions 28 other than the long underfloor inflexible tube portion 38 can extend along the long underfloor inflexible tube portion 38 and substantially in parallel therewith. When the wire harness 9 is arranged in such a state, the whole length of the wire harness 9 can be shortened and the wire harness 9 can be packed with a minimum width. That is, the whole of the wire harness 9 is packed in a compact state. The wire harness 9 is transported in the compact state as it is.

When the wire harness 9 is attached and fixed to the fixing target 47 by use of the clamps 18 as shown in FIG. 9, wiring path arrangement is completed. As is understood from the aforementioned configuration and structure, the wire harness 9 can be formed and arranged between one shield connector 17 and the other shield connector 17 so as to keep the whole of the high voltage conductive path 15 away from moisture (that is, waterproof).

According to the wire harness according to the first embodiment, as has been described above with reference to FIGS. 1 to 9, it is possible to provide a wire harness 9 higher in waterproof performance than in the background art.

Second Embodiment

Figure 10A:
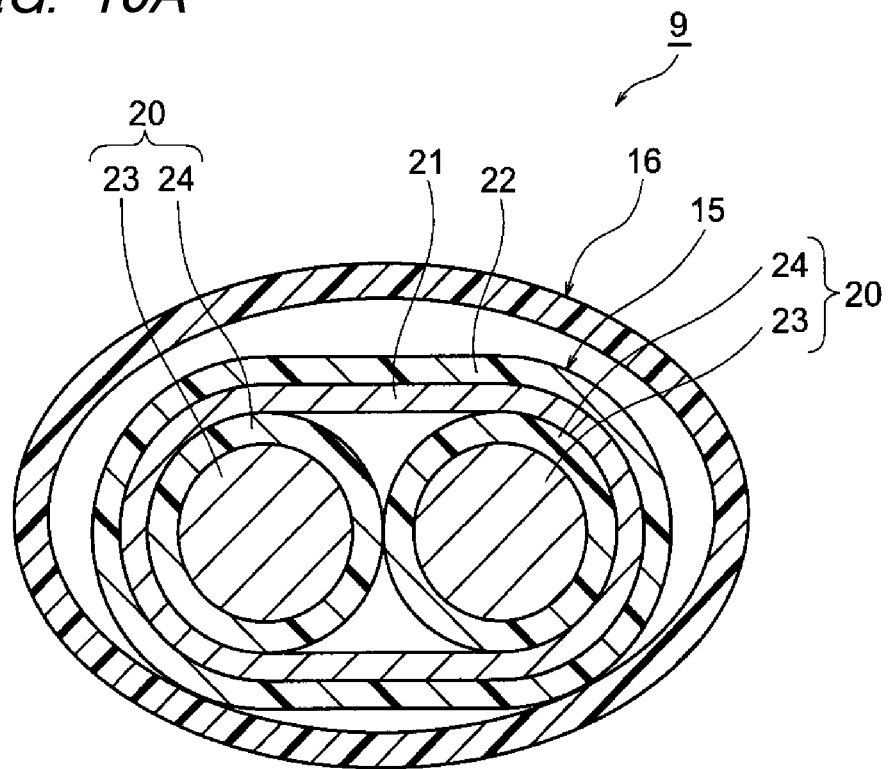
FIGS. 10A and 10B are cross-sectional views of a wire harness according to a second embodiment.
Figure 10B:
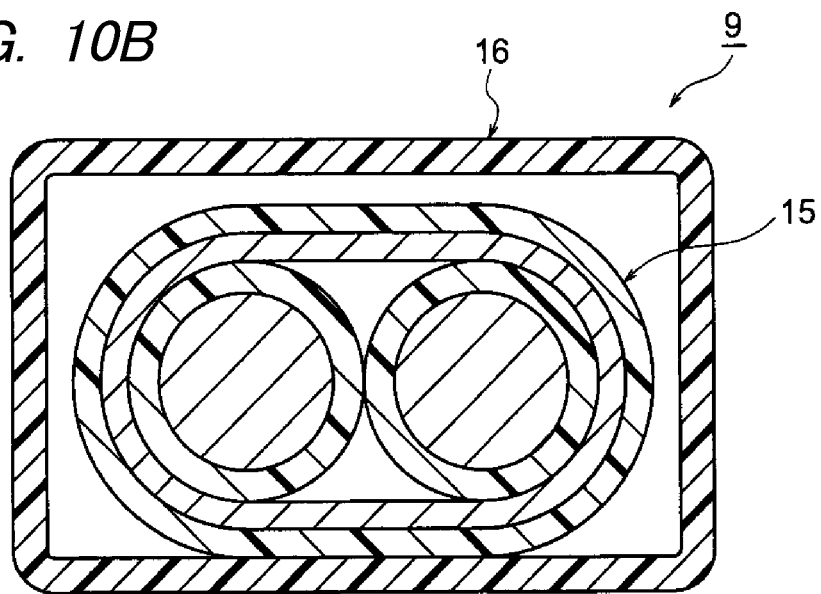

A second embodiment of a wire harness according to the invention will be described below with reference to FIGS. 10A and 10B. FIGS. 10A and 10B are cross-sectional views showing the wire harness according to the second embodiment. Incidentally, constituent members essentially the same as those in the aforementioned first embodiment are referenced correspondingly, and description thereof will be omitted. In addition, the wire harness according to the second embodiment is used in a similar arrangement as the wire harness according to the first embodiment.

In FIGS. 10A and 10B, a wire harness 9 has a high voltage conductive path 15, an exterior member 16 which accommodates and protects the high voltage conductive path 15, and shield connectors 17 (see FIG. 8) provided at terminals of the high voltage conductive path 15. The exterior member 16 is formed not into a sectionally circular shape as in the first embodiment but into a sectionally elliptic shape (which may be replaced by an oval shape) in accordance with the external shape of the high voltage conductive path 15. Alternatively, the exterior member 16 is formed into a sectionally rectangular shape.

Since the exterior member 16 is formed into a sectionally elliptic shape or a sectionally rectangular shape, the height of the exterior member 16 becomes lower than that in the first embodiment. Thus, there is an effect that a distance from the ground can be secured when the exterior member 16 is attached and fixed to a vehicle underfloor 11 (see FIG. 1). In addition, since the exterior member 16 is formed into a sectionally elliptic shape or a sectionally rectangular shape, the occupancy of the high voltage conductive path 15 in the internal space can be enhanced so that the heat of the high voltage conductive path 15 can be transmitted to the exterior member 16 easily.

In order to make it easy to transmit the heat to the exterior member 16, the exterior member 16 having a sectionally rectangular shape shown in FIG. 10B is more effective. This is because the contact area with the high voltage conductive path 15 increases.

The wire harness 9 that includes, in its configuration, the exterior member 16 having a sectional shape as described above of course provides a similar effect as the first embodiment.

Third Embodiment

Figure 11:
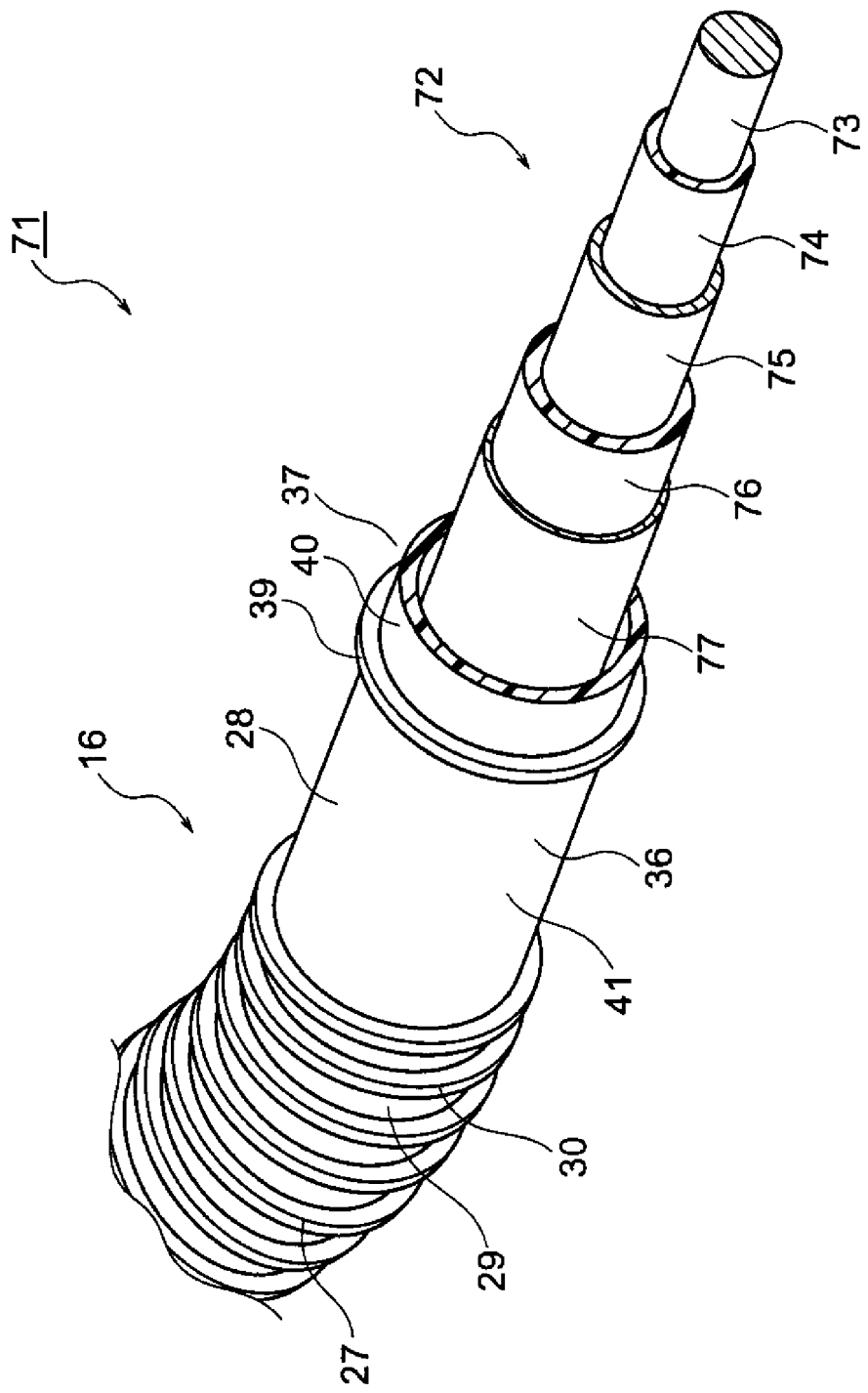
FIG. 11 is a sectional perspective view of a wire harness according to a third embodiment.

A third embodiment of a wire harness according to the invention will be described below with reference to FIG. 11 FIG. 11 is a perspective view (including a cross-sectional view) showing a modification of the wire harness according to the third embodiment. Incidentally, constituent members essentially the same as those in the aforementioned first embodiment are referenced correspondingly, and description thereof will be omitted. In addition, the wire harness according to the third embodiment is also arranged in a similar manner as the wire harness according to the first embodiment.

In FIG. 11, a wire harness 71 has a high voltage coaxial composite conductive path 72 which is a high voltage conductive path, an exterior member 16 which accommodates and protects the high voltage coaxial composite conductive path 72, and not-shown shield connectors which are provided at terminals of the high voltage coaxial composite conductive path 72.

The high voltage coaxial composite conductive path 72 is arranged to bear both a plus circuit and a minus circuit by itself. That is, the high voltage coaxial composite conductive path 72 is arranged to include circuits of two systems. Specifically, the high voltage coaxial composite conductive path 72 has a first conductive path 73, a first insulator 74, a second conductive path 75, a second insulator 76 and a shield member 77. The first conductive path 73 is circular in section and is located at the center of the high voltage coaxial composite conductive path 72. The first insulator 74 covers the outer circumference of the first conductive path 73 with a predetermined thickness. The second conductive path 75 is provided on the outer side of the first insulator 74. The second insulator 76 covers the outer circumference of the second conductive path 75 with a predetermined thickness. The shield member 77 is cylindrical and in close contact with the outer surface of the second insulator 76. Incidentally, the high voltage coaxial composite conductive path 72 may further include a sheath which covers the outer circumference of the shield member 77 with a predetermined thickness.

The shield member 77 is made of a well-known braid, metal foil, or the like. Although the shield member 77 is arranged to belong to the configuration of the high voltage coaxial composite conductive path 72 as described above, the shield member 77 may be arranged as follows. That is, the shield member 77 may be arranged to be slightly loosely fitted to the second insulator 76. The shield member 77 may be formed into a cylindrical shape so that the shield member 77 can be brought into close contact with the outer surface of the second insulator 76, or the shield member 77 may be formed into a tape-like or sheet-like shape so that the shield member 77 can be wound on the outer surface of the second insulator 76 and in close contact therewith.

Although the high voltage coaxial composite conductive path 72 has two systems in the embodiment, the high voltage coaxial composite conductive path 72 is not limited thereto. The high voltage coaxial composite conductive path 72 may have three systems . . . , or n systems. The high voltage coaxial composite conductive path 72 can have n systems if circuits are added outward to keep the configuration as a single coaxial path.

The third embodiment of course provides a similar effect as the first embodiment.

The wire harness according to the embodiments will be summarized below.

(1) A wire harness 9 according to an embodiment includes at least one conductive path (the high voltage conductive path 15) and an exterior member 16 having a tubular configuration covering the conductive path. The conductive path is formed in an elongated manner to be arranged longitudinally along a vehicle underfloor 11. The exterior member 16 is made of resin, and is provided in a form without any seam or slit that communicates its outer surface 25 and inner surface 26 with each other and in an elongated manner in accordance with length of the conductive path.

(2) In the wire harness 9 according to the embodiment, the exterior member 16 includes the flexible tube portion 27 having flexibility and the inflexible tube portion 28 having less flexibility than the flexible tube portions 27.

(3) In the wire harness 9 according to the embodiment, the flexible tube portion 27 is provided near the terminal of the exterior member 16.

(4) In the wire harness 9 according to the embodiment, the flexible tube portion 27 provided near the terminal of the exterior member 16 is formed to have a length that allows the terminal portion of the flexible tube portion 27 to extend to the vicinity of the connection member (shield connector 17) provided at the terminal (terminal portion 34) of the conductive path.

(5) In the wire harness 9 according to the embodiment, a flexible waterproof member (boot 33) extending to the connection member is attached to the terminal portion of the flexible tube portion 27 provided near the terminal of the exterior member 16.

(6) In the wire harness 9 according to the embodiment, the water stop member (grommet 19) is attached to outer surfaces of the flexible tube portions 27, the water stop member being watertight against a member (fixing target 47) on which the wire harness is arranged.

(7) In the wire harness 9 according to the embodiment, the conductive path is formed in an elongated manner so as to be arranged longitudinally along the vehicle underfloor 11 from an engine room 6 disposed on a front side of the vehicle underfloor 11.

(8) In the wire harness 9 according to the embodiment, the conductive path is a high voltage conductive path 15 including a shield member 21.

In addition, it is a matter of course that various changes can be made in the invention without changing the gist of the invention.

As an example of a modification, heat reflecting portions for reflecting heat from the outside may be provided at a plurality of places in the outer surface of the exterior member 16 according to any one of the first to third embodiments. In addition, for example, an identification portion for identifying the fact of high voltage may be provided all over the outer surface of the exterior member 16 or a plurality of such identification portions may be provided at desired places.

What is claimed is:

1. A wire harness comprising at least one conductive path and an exterior member having a tubular configuration covering the conductive path,
   wherein the conductive path is formed in an elongated manner to be arranged longitudinally along a vehicle underfloor,
   wherein the exterior member is made of resin, and is provided in a form without any seam or slit that communicates an outer surface and an inner surface of the exterior member with each other and in an elongated manner in accordance with a length of the conductive path,
   wherein the exterior member comprises a flexible tube portion having flexibility and an inflexible tube portion having less flexibility than the flexible tube portion,
   wherein the flexible tube portion is provided near a terminal of the exterior member, and
   wherein a flexible waterproof member extends to a connection member provided at a terminal of the conductive path, and is attached to a terminal portion of the flexible tube portion provided near the terminal of the exterior member.

2. The wire harness according to claim 1, wherein the flexible tube portion provided near the terminal of the exterior member is formed to have a length that allows the terminal portion of the flexible tube portion to extend to a vicinity of the connection member provided at the terminal of the conductive path.

3. The wire harness according to claim 1, wherein a water stop member is attached to an outer surface of the flexible tube portion, the water stop member being watertight against a member on which the wire harness is arranged.

4. The wire harness according to claim 1, wherein the conductive path is formed in an elongated manner so as to be arranged longitudinally along the vehicle underfloor from an engine room disposed on a front side of the vehicle underfloor.

5. The wire harness according to claim 1, wherein the conductive path is a high voltage conductive path including a shield member.

6. The wire harness according to claim 1, wherein the inflexible tube portion includes at least one longitudinal rib extending in an axial direction of the exterior member.

7. The wire harness according to claim 1, wherein the inflexible tube portion includes at least one circumferential rib extending in a circumferential direction of the exterior member.

8. The wire harness according to claim 1, further comprising a clamp attached to the inflexible tube portion, the clamp including an attaching portion attached to the inflexible tube portion and a movement restriction portion on each side of the attaching portion to restrict a movement of the attaching portion in an axial direction of the exterior member.

9. The wire harness according to claim 1, wherein the flexible tube portion is configured to be resumable, after being bent, to an original shape of the flexible tube portion before being bent.

10. The wire harness according to claim 9, wherein the flexible tube portion comprises a wiring path arrangement flexible tube portion configured to be bent during an arrangement of the wire harness and a transportation flexible tube portion configured to be bent during a transportation of the wire harness.

11. The wire harness according to claim 10, wherein the transportation flexible tube portion is configured to be bent such that the inflexible tube portion on one side of the transportation flexible tube portion and another inflexible tube portion on an opposite side of the transportation flexible tube portion are arranged substantially parallel to each other.

* * * * *